US011432539B2

(12) United States Patent
Kaye et al.

(10) Patent No.: US 11,432,539 B2
(45) Date of Patent: Sep. 6, 2022

(54) INSECT TRAP

(71) Applicant: Brandenburg (UK) Limited, West Midlands (GB)

(72) Inventors: Mathew Varghese Kaye, West Midlands (GB); Carl Baptista, West Midlands (GB)

(73) Assignee: BRANDENBURG (UK) LIMITED

( * ) Notice: Subject to any disclaimer, the term of this patent is extended or adjusted under 35 U.S.C. 154(b) by 0 days.

(21) Appl. No.: 16/758,778

(22) PCT Filed: Oct. 22, 2018

(86) PCT No.: PCT/IB2018/058199
§ 371 (c)(1),
(2) Date: Apr. 23, 2020

(87) PCT Pub. No.: WO2019/082051
PCT Pub. Date: May 2, 2019

(65) Prior Publication Data
US 2020/0375168 A1    Dec. 3, 2020

(30) Foreign Application Priority Data
Oct. 23, 2017 (GB) ...................................... 1717415

(51) Int. Cl.
*A01M 1/04* (2006.01)
*A01M 1/02* (2006.01)
(Continued)

(52) U.S. Cl.
CPC .............. *A01M 1/04* (2013.01); *A01M 1/026* (2013.01); *A01M 1/106* (2013.01); *A01M 1/145* (2013.01);
(Continued)

(58) Field of Classification Search
CPC .......... A01M 1/04; A01M 1/145; A01M 1/14; A01M 1/106
See application file for complete search history.

(56) References Cited

U.S. PATENT DOCUMENTS 5,651,211 A * 7/1997 Regan ................... A01M 1/145
43/113
6,108,965 A * 8/2000 Burrows ............... A01M 1/145
43/113
(Continued)

FOREIGN PATENT DOCUMENTS

EP    0947134 A2   10/1999
EP    1457111 A1    9/2004
(Continued)

*Primary Examiner* — Magdalena Topolski
*Assistant Examiner* — Shada Mohamed Alghailani
(74) *Attorney, Agent, or Firm* — Fishman Stewart PLLC

(57) ABSTRACT

The present disclosure describes a trap for catching or killing insects, and a method of attracting flying insects to an insect trap. The trap includes a back housing, an insect capture or killing mechanism, an insect attracting light source including light emitting diodes (LEDs) that emit ultra violet radiation, and a cover with openings that allow insects to enter the trap. The light source is directed immediately inwardly through plus or minor 45 degrees towards the insect capture or killing mechanism and is precluded from being directed immediately outwardly through the cover.

16 Claims, 5 Drawing Sheets

(51) Int. Cl.
   *A01M 1/10* (2006.01)
   *A01M 1/14* (2006.01)
   *A01M 1/16* (2006.01)

(52) U.S. Cl.
   CPC ....... *A01M 1/165* (2013.01); *A01M 2200/012* (2013.01)

(56) References Cited

U.S. PATENT DOCUMENTS

| | | | | |
|---|---|---|---|---|
| 6,568,124 | B1* | 5/2003 | Wilbanks | A01M 1/023 43/112 |
| 6,920,716 | B2* | 7/2005 | Kollars, Jr. | A01M 1/023 43/107 |
| 7,383,660 | B2* | 6/2008 | Greening | A01M 1/145 43/113 |
| 7,607,255 | B2* | 10/2009 | Hu | A01M 1/106 43/111 |
| 8,978,290 | B2* | 3/2015 | Wright | A01M 1/103 43/113 |
| 2003/0089024 | A1* | 5/2003 | Nelson | A01M 1/145 43/113 |
| 2003/0154644 | A1* | 8/2003 | Lambert | A01M 1/145 43/107 |
| 2005/0055870 | A1* | 3/2005 | Yelverton | A01M 1/10 43/113 |
| 2007/0169401 | A1* | 7/2007 | Chyun | A01M 1/145 43/113 |
| 2008/0034643 | A1* | 2/2008 | Chen | A01M 1/04 43/112 |
| 2008/0229652 | A1* | 9/2008 | Willcox | A01M 1/145 43/113 |
| 2009/0038207 | A1* | 2/2009 | Lin | A01M 1/223 43/112 |
| 2009/0100743 | A1* | 4/2009 | Prater | A01M 1/223 43/112 |
| 2009/0277073 | A1* | 11/2009 | Chen | A01M 1/223 43/112 |
| 2009/0288333 | A1* | 11/2009 | Johnston | A01M 1/02 43/113 |
| 2011/0283599 | A1* | 11/2011 | Wu | A01M 1/106 43/113 |
| 2014/0026467 | A1* | 1/2014 | Kaye | A01M 1/145 43/113 |
| 2015/0144713 | A1* | 5/2015 | Formico | A01M 29/12 239/276 |
| 2016/0345569 | A1* | 12/2016 | Freudenberg | A01M 1/2016 |
| 2017/0006847 | A1* | 1/2017 | McGowan | A01M 1/223 |
| 2017/0367314 | A1* | 12/2017 | Billingsley, Jr. | A01M 1/223 |
| 2019/0000059 | A1* | 1/2019 | Marka | A01M 31/002 |

FOREIGN PATENT DOCUMENTS

| | | |
|---|---|---|
| GB | 2420957 A | 6/2006 |
| GB | 2459717 A | 11/2009 |
| KR | 20160002140 A | 1/2016 |
| KR | 20160028318 A | 3/2016 |
| KR | 20170017186 A | 2/2017 |
| WO | 2009131340 | 10/2009 |

* cited by examiner

INSECT TRAP

CROSS-REFERENCE TO RELATED APPLICATIONS

This application is a national stage entry of and claims priority to International Patent Application No. PCT/M2018/058199 filed Oct. 22, 2018, which claims priority to Great Britain Patent Application No. GB 1717415.2 filed Oct. 23, 2017, the contents of each of which is hereby incorporated by reference in their entirety.

TECHNICAL FIELD

The present invention relates to an insect trap and more particularly to an insect trap comprising a back housing, a cover capable of transmitting light there through, and a light source comprising light emitting diodes, hereafter LEDs, which emit ultra violet (UV) light.

BACKGROUND

Insect traps of various types are well known. A particularly common trap type, particularly for flying insects, comprises an insect attractant means, such as, for example a fluorescent UV light source and an insect trapping or killing means, such as, for example an adhesive board or paper or an electronic fly zapper, contained in a housing. The flying insects are attracted to the trap, enter the housing through openings and get caught on the trapping means or hit the zapper and are killed. To maintain efficiency of capture (or killing), the adhesive board or paper needs to be regularly replaced and/or the trap cleaned. The adhesive board or paper also needs to be inspected and records kept. The lights also need to be cleaned as insects get "welded" to the bulbs, and in any case the lights have a limited life span.

A typical basic trap of this type with a glue board is disclosed in EP1457111, and comprises a translucent cover with an innermost surface which helps maximise UV emission from the trap, thus improving capture efficiency.

Related family member EP0947134 claims a further aspect of such a trap which is adapted to ensure the insect capture means is, to a significant extent, not readily visible through the cover. To this end, and in a particularly favoured embodiment, the cover comprises louver openings angled to also prevent the glue board being visible when viewed substantially perpendicularly to a plane of the back housing. A more favoured arrangement is one in which the louver openings are paired about a centre point to provide a downward and upward inflexion respectively. Such an arrangement helps to draw air in at the bottom of the trap.

Conventional UV fluorescent tubes are however expensive to run and need to be regularly replaced.

KR20160028318 disclosed a light trap using a LED bulb operating in the wavelength range of 460-550 nm.

KR20170017186 discloses a light trap using an LED tube operating in the wavelength range 350-370 nm.

WO2016310905 discloses an LED unit having a dual function. It emits light at two wavelengths 380-410 (UV) and 700-1500 (IR), The former provides a sterisiling function and the later a drying function, the unit being used to kill fruit flies.

WO2009131340 discloses an LED alternative to a fluorescent bulb.

KR2017000393 discloses a UV LED bulb which includes two LEDs in a tube to address issues of polarity when fitting in a conventional device.

What is apparent from all of this art is that it builds on the traditional art, and assumes the LED's must be fitted in an equivalent manner to a traditional UV bulb.

Applicant has recognised that this is not the case and alternative configurations and trap designs are possible with the consequence trap design can be simplified and greater capture efficiency attained.

SUMMARY

It is an object of the present invention to provide a simpler or cheaper trap from a manufacture and/or maintenance perspective.

It is an alternative and further object to improve capture efficiency.

According to a first aspect of the present invention there is provided a trap for catching or killing insects comprising
a. a back housing;
b. an insect capture or killing means;
c. an insect attracting light source; and
d. a cover, comprising openings allowing insects to enter the trap, through which insect attracting light is dispersed;
wherein the light source comprises light emitting diodes (LED's) which emit ultra violet (UV) radiation.

Advantageously the LED's are mounted between said back housing and the cover such that the light emitted is not transmitted directly outwardly.

Preferably the light is directed within the trap, and more preferably it is directed substantially parallel to a plane of the back housing (referred to as 180 degree—as opposed to 90 degree outwardly (out of the housing) or 90 degree inwardly (toward the back housing).

The LEDs used had a specification as follows:
Table 1

TABLE 1

| Parameter | Symbol | Value | Unit |
|---|---|---|---|
| Peak wavelength [1] | $\lambda_p$ | 365 | nm |
| Radiant Flux [2] | $\Phi_e$ [3] | 420 | mW |
| Forward Voltage [4] | $V_F$ | 3.6 | V |
| Spectrum Half Width | $\Delta \lambda$ | 9 | nm |
| View Angle | $2\Theta_{1/2}$ | 120 | deg. |
| Thermal resistance | $R\theta_{3-b}$ [5] | 9.25 | °C./W |

($T_a$ = 25° C., RH = 30%)

Thus, in one embodiment the light may be directed across the plane radiating by plus 60 degrees to minus 60 degrees (spread), though plus 45 degrees to minus 45 degrees (spread), through plus 30 degrees to minus 30 degrees (spread), and through plus 15 degrees to minus 15 degrees (spread). This can be achieved by the natural configuration of the LED or by the use of guides or baffles e.g. a U-shaped or other shielding-shaped member, which channel the light in the desired direction.

By directing light substantially in this plane, capture efficiency has been increased substantially (compared to directing the light outwardly of the trap, as per the orientation of conventional fluorescent UV tubes.)

To facilitate this, an array of LED lights are mounted in front of the back housing and insect capture or killing means, and behind the cover, on a mount and the light is directed or channelled within the trap.

Preferably the mount is positioned at, or inset from, the perimeter of the back housing, and comprise one or two pairs of facing LED carrying members, or is of a substantially circular configuration, such that the LED's are orientated in facing relationship to direct light to the centre of the trap.

Preferably the LED carrying member(s) is/are substantially U-shaped to preclude light from being directed immediately outwardly, through the cover, or immediately inwardly onto the insect capture means, i.e. the angle of incidence is controlled to e.g. plus/minus 45 degrees, through plus/minus 30 degrees and plus/minus 15 degrees.

The use of LEDs also avoids the need for ballast, which is absent in the trap of the present invention.

Preferably the trap comprises 30-40 LEDs with a peak wavelength of 360-370 nm.

Preferably the trap is a SMART internet enabled trap.

According to a second aspect of the present invention there is provided a method of attracting flying insects to an insect trap comprising diffusing light emitted by light emitting diodes (LEDs) which emit ultra violet (UV) radiation through a translucent cover to attract insects thereto.

Of course, the trap of the invention can include all the other features of traditional traps such as those disclosed in, for example, WO 2009/133372 and EP2651214.

BRIEF DESCRIPTION OF THE DRAWINGS

The various aspects of the invention will be described further, by way of example, with reference to the following figures in which:

FIG. 2 is a trap of the invention with the cover on;

DETAILED DESCRIPTION

Figure 1:
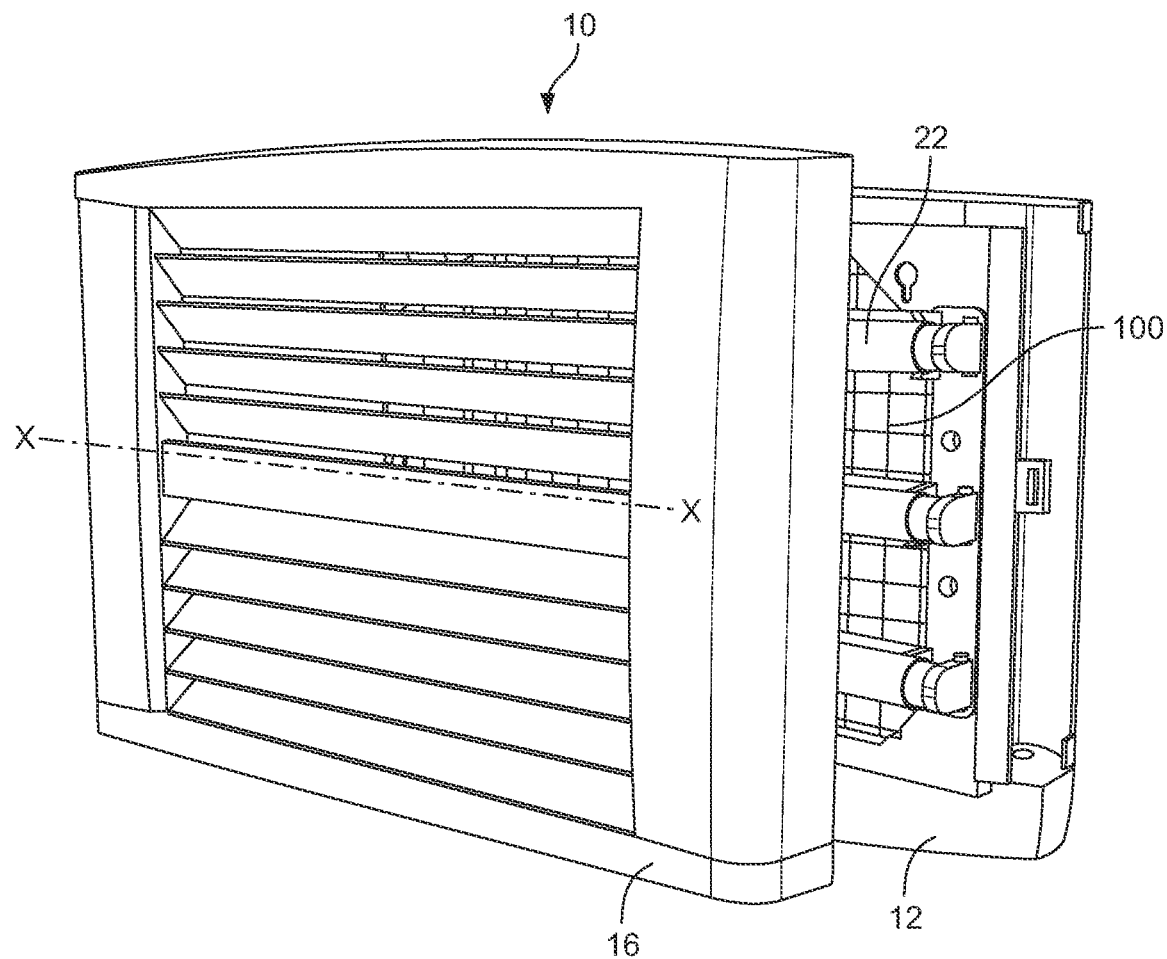
FIG. 1 is an exploded perspective view of a typical prior art insect trap showing the cover being removed and the frame slightly open with conventional UV fluorescent tubes.

FIG. 1 illustrates a typical prior art insect trap (10). It comprises a number of basic components: a back housing (12), a light source in the form of fluorescent, UV emitting tubes (22), an insect capture means (100) and a cover (16). The figure shows the fluorescent tubes carried on a frame hinged to the back housing. The plane of the back housing, and insect capture means, runs in the direction X-X.

Figure 2:
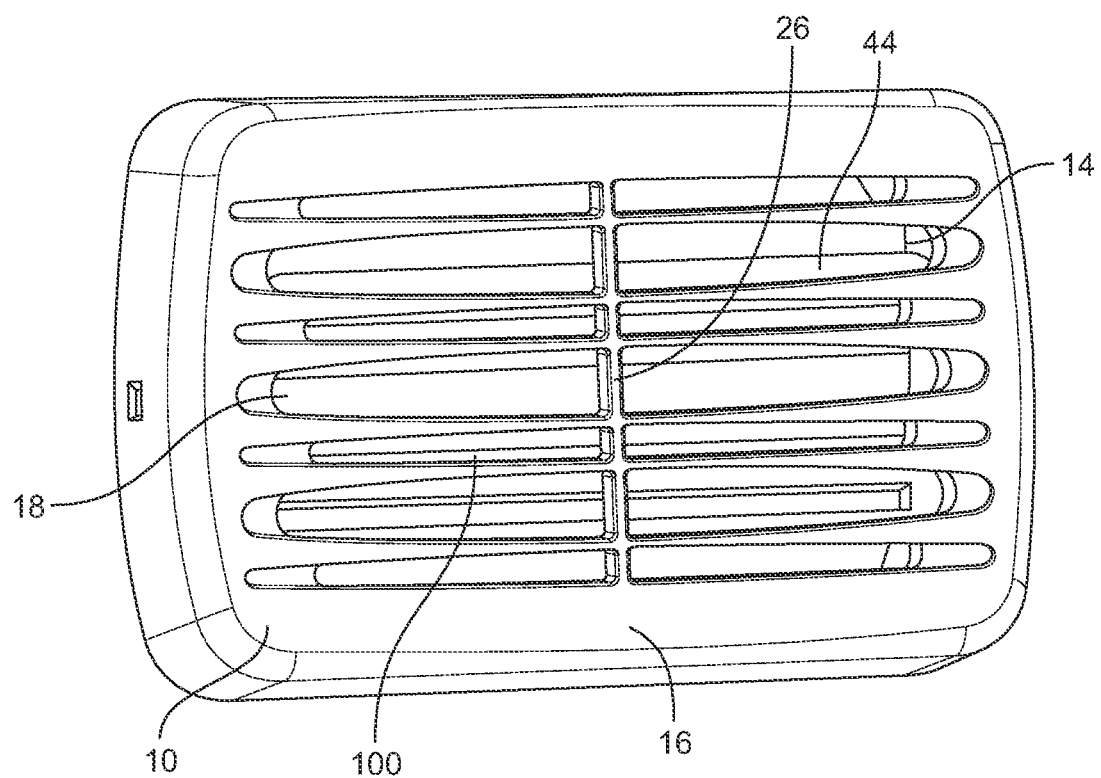
Figure 3:
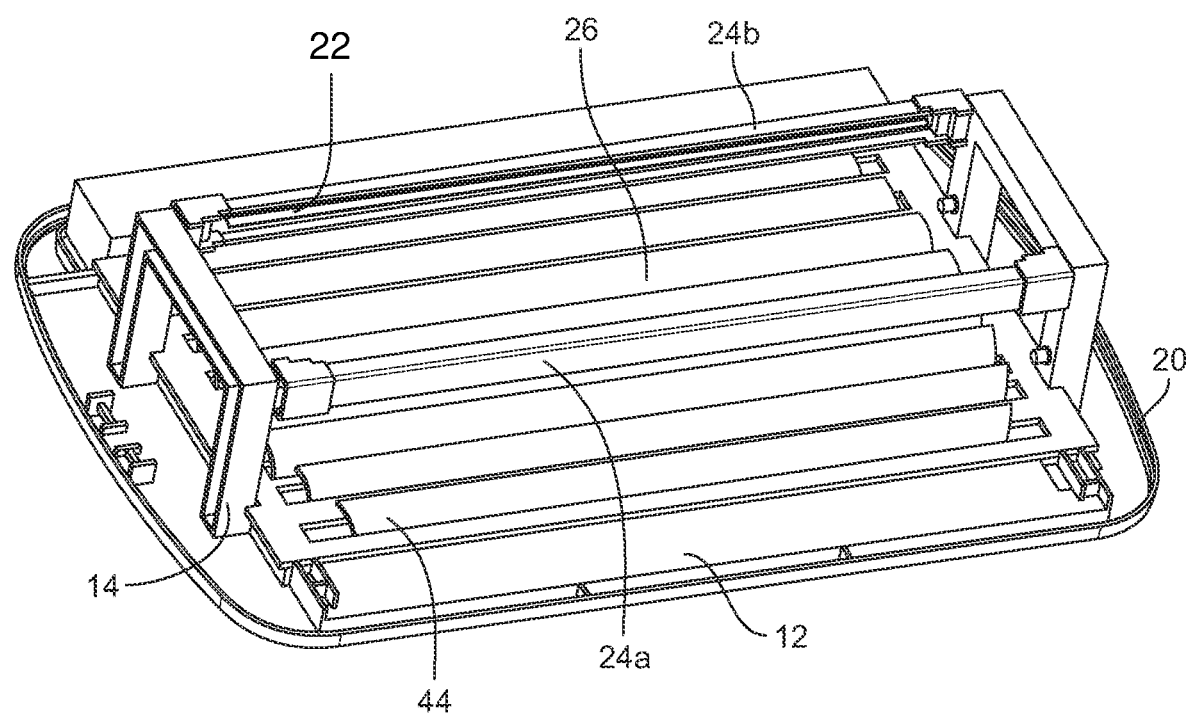
FIG. 3 is a trap of the invention with the cover removed to show the back housing, an insect capture means, reflectors and a LED containing mount.
Figure 4:
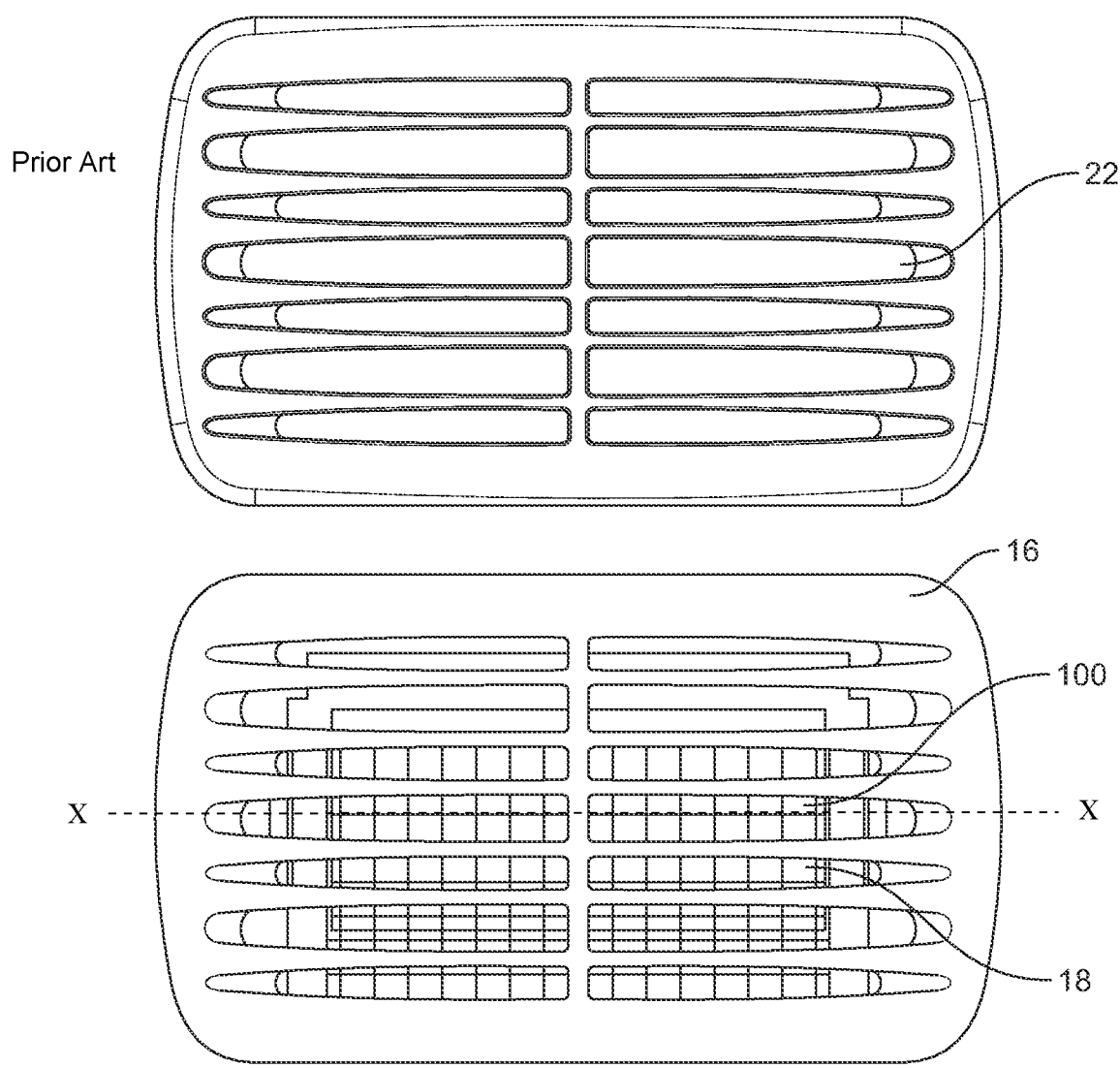
FIG. 4 is a comparator photo' illustrating an illuminated insect trap with conventional fluorescent tubes (upper) verses one with LEDs (lower)
Figure 5A:
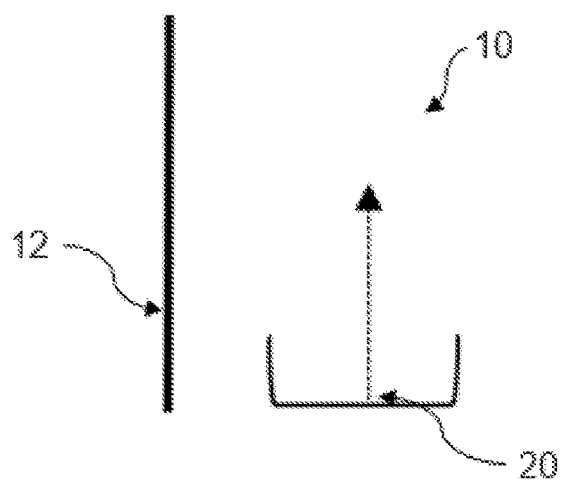
FIG. 5A is a trap of the invention where the insect attracting light (shown by arrow) is directed parallel to a plane running parallel to the back housing, the insect capture means, and the cover.
Figure 5B:
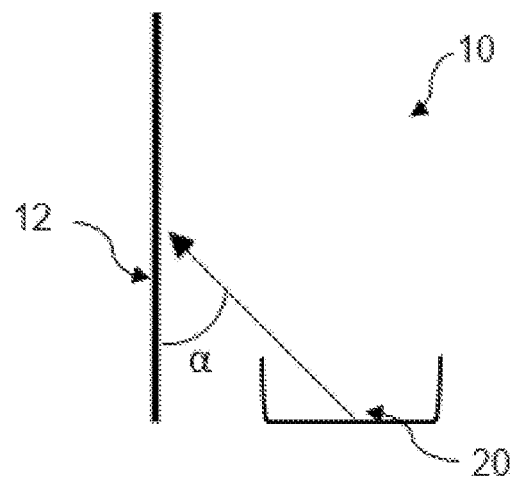
FIG. 5B is a trap of the invention where the insect attractive light (shown by arrow) is splayed inwardly at an angle α to the plane.

In contrast, and as illustrated in FIGS. 2, 3 and 4 (lower), the insect trap of the invention (10) comprises a cover (16) which hides the LEDs from view. All that can be seen through the cover openings (18) (when the lights are off) are a minor portion of the glue board (100), a minor portion of the mount (14) supporting the LEDs, and a minor portion of the reflectors (44).

Referring to FIG. 3 the mount (14) projects from, and is mounted to, the back housing (12) and comprises two pairs of facing LED carrying members (24a; 24b) which are inset from, a perimeter (20) of the back housing. Such a configuration has been shown by experiment (see below) to significantly improve insect capture.

This or, for example, a substantially circular configuration orientates the LEDs in facing relationship to direct light to the centre (26) of the trap.

A further and significant feature in maximising capture efficiency is to shield the LEDs so the light is directed in a plane (X-X) parallel to the back housing (12). This may be achieved by housing the LEDs in e.g. a substantially U-shaped LED carrying member(s) (24) (the LEDs are not visible in the Fig) which preclude light from being directed immediately outwardly through the cover (16) or immediately inwardly onto the insect capture means (100).

The cover (16) is made of a translucent material and has an innermost surface which is shaped or roughened to maximise the transmission of UV light as set out in EP1457111. The openings (18) which allow insects to enter the trap are shaped to prevent the lights (22) being visible when viewed substantially perpendicularly to the normal plane (X-X) of the back housing (12). The general principle of maintaining a pleasant appearance of a trap is set out in EP0947134.

The data supporting the claimed invention is set out in the Examples below:

EXAMPLES

Methodology
1. Test Procedure—1 hour Fly Catch tests (Single trap test)
1.1 Houseflies were reared using a standard rearing procedure. Three to four day old, mixed sex flies were used in the experiments;
1.2 200× flies were used for each replicate;
1.3 Before commencing the test, the Fly Test Room was cleaned of any residual flies from previous tests. Walls and floors were moped using a mild detergent in water.
1.4 Test Room measures 6 metres (length) by 3 metres (width) by 3 metres (height);
1.5 The test room contains 8× 40 Watt Fluorescent tubes evenly spaced and mounted on the ceiling;
1.6 Each tube is 4 m in length and is a 'Cool white' colour;
1.7 Ambient UVA and the visible light intensity of the rooms fluorescent light lamps were measured immediately before the release of flies into the room;
1.8 Immediately after the commencement of each test ambient UVA and visible light were measured at a fixed point, from the centre of the room. The reading was taken with the sensor face parallel to the ceiling, at a distance of 1.5 metres from the ground;
1.9 Temperature was maintained at 25±3° C. and temperature and relative humidity was recorded immediately before the release of any flies into the room;
1.10 Traps were placed at 1.8 m from the floor to the underside of the trap, centrally on either of the long walls;
1.11 Trap UV output was measured by calibrated UVA test equipment on the centre UV face of the trap at a distance of 1 meter from the face.
1.12 Two Hundred (200×) mixed sex flies were transferred into the room, at the end farthest from the door, in the corner farthest from the trap. allowed to acclimatize for 30 minutes to the new room environment with the traps switched OFF;
1.13 After 30 minutes of acclimatization, the traps were switched ON, environmental parameters recorded, and the traps were allowed to operate. The flies were then released and the numbers of flies trapped was recorded every 30 min for a total of 60 minutes.

Results

The results from sequential tests are set out in the Tables below:

Test 1
40 LED array (comparing outwardly and inwardly facing LEDs)

TABLE 2

| Design | Ave Catch (60 min) |
|---|---|
| LED Outwardly | 44% |
| LED Inwardly | 93% |

Surprisingly this test suggested that, unlike with fluorescent tubes, it was not desirable to directly transmit the light outwardly, to obtain the most efficient capture.

Test 2
28 LED array with directional testing and testing the effect of the translucent cover.

TABLE 3

| Design | Ave Catch (60 min) |
|---|---|
| LED Inwardly (90 deg - towards glue board) | 50% |
| LED Parallel (180 deg) | 72% |
| LED Splayed (45 deg inward) | 80% |
| LED Splayed (45 deg inward) translucent cover blackened | 44% |

This test demonstrated that the translucent cover was, like with a traditional fluorescent tube, still playing a significant effect in attracting insects, and that the "internal lighting" of the trap was of significance.

Test 3
30 LED array—Additional effect of directional control, using guides or baffles, to limit the direction of light transmission and further effect of translucent cover.

TABLE 4

| Design | Ave Catch (60 min) |
|---|---|
| LED Parallel (180 deg) plus directional guides precluding light being transmitted directly outwardly | 83% |
| LED Parallel (180 deg) plus directional guides but with translucent cover blackened | 40% |

The results showed that the use of guides to control the direction of emission maximised catch and that the translucency of the cover was of significance.

Test 4
30 LED array—Comparative study between UV fluorescent trap and UV LED trap of otherwise equivalent design.

TABLE 5

| Cobra trap (3 x fluorescent tubes) | | | | | | |
|---|---|---|---|---|---|---|
| Time post insect | Cobra trap (fluorescent) | | | | | Catch |
| release (minutes) | 1 | 2 | 3 | 4 | 5 | (Ave) |
| Replicate | 30 | 46 | 62 | 64 | 50 | 32 | 50.8 |
| | 60 | 58 | 86 | 80 | 72 | 58 | 70.8 |

TABLE 6

| Cobra trap (30 LED (UV) array) | | | | | | |
|---|---|---|---|---|---|---|
| Time post insect | Cobra trap (LED) | | | | | Catch |
| release (minutes) | 1 | 2 | 3 | 4 | 5 | (Ave) |
| Replicate | 30 | 59 | 53 | 53 | 55 | 52 | 54.4 |
| | 60 | 88 | 83 | 82 | 84 | 80 | 83.4 |

The results show a statistically significant improvement in catch rate over 60 minutes (20% improvement).

TABLE 7

| (Statistical analysis on Table 5 data) t-Test: Paired Two Sample for Means 60 mins | | |
|---|---|---|
| | CCT | LCT |
| Mean | 70.8 | 83.4 |
| Variance | 161.2 | 8.8 |
| Observations | 5 | 5 |
| Pearson Correlation | −0.223025967 | |
| Hypothesized Mean Difference | 0 | |
| df | 4 | |
| t Stat | −2.061422972 | |
| P(T <= t) one-tail | 0.054138833 | |

A statistically significant p value of 0.05 confirms the greater capture efficiency of the LED trap over a conventional fluorescent tube trap after 60 minutes of operation.

Finally, FIG. 4 illustrates, photographically, the different appearance of the two traps—LED (lower) compared to fluorescent (upper).

The invention claimed is:
1. A trap for catching or killing insects comprising:
   a. a back housing;
   b. an insect capture or killing mechanism disposed in front of the back housing;
   c. an insect attracting light source comprising light emitting diodes (LEDs) that emit ultra violet (UV) radiation with a peak wavelength of 360-370 nm; and
   d. a cover, comprising openings allowing insects to enter and through which insect attracting light is dispersed, the cover being disposed in front of the back housing;
   wherein a plane (X-X) runs parallel to the back housing, the insect capture or killing mechanism, and the cover, and the insect attracting light source is positioned between the cover and the insect capture or killing mechanism and the LEDs are mounted in front of the back housing and the insect capture or killing mechanism, and behind the cover on a mount such that the insect attracting light source directs light:
   parallel to the plane (X-X) and with a spread of between plus 60 degrees to minus 60 degrees relative to the plane (X-X), by the natural configuration of the LEDs or by guides or baffles that channel the insect attracting light in the desired direction, and to a centre of the trap away from a perimeter running between the cover and the back housing.
2. The trap as claimed in claim 1, wherein the guides or baffles comprise a carrying member and the LEDs are housed in the carrying member.
3. The trap as claimed in claim 2, wherein the carrying member is shaped such that the light emitted is splayed to the plane (X-X) running parallel to the back housing, the cover, and the insect capture or killing mechanism.

4. The trap as claimed in claim 3, wherein the splay is up to 30 degrees relative to the plane (X-X) towards the insect capture or killing mechanism.

5. The trap as claimed in claim 1, wherein the mount is positioned at, or inset from, the perimeter running between the cover and the back housing, and comprises a pair of facing LED carrying members, such that the LEDs are orientated in facing relationship and directed parallel to the plane (X-X) to direct light to the centre of the trap.

6. The trap as claimed in claim 5, wherein the pair of facing LED carrying members are substantially U shaped to preclude light from being directed immediately outwardly through the cover or immediately inwardly onto the insect capture or killing mechanism and structured to control the spread of the light to plus 30 degrees to minus 30 degrees relative to the plane (X-X).

7. The trap as claimed in claim 1, further comprising reflectors seated in front of the insect capture or killing mechanism and behind or in front of the insect attracting light source.

8. The trap as claimed in claim 1, wherein the insect attracting light source includes 30-40 LEDs.

9. The trap as claimed in claim 1, which is a smart internet enabled trap.

10. The trap as claimed in claim 3, wherein the splay is up to 15 degrees relative to the plane (X-X) towards the insect capture or killing mechanism.

11. The trap as claimed in claim 2, further comprising at least one reflector seated in front of the insect capture or killing mechanism and behind or in front of the insect attracting light source.

12. The trap as claimed in claim 1, wherein the mount is of a substantially circular configuration, such that the LEDs are oriented in facing relationship to direct light to the centre of the trap.

13. The trap as claimed in claim 1, wherein the insect attracting light source is directed parallel to the plane (X-X) and with the spread controlled to plus 45 degrees to minus 45 degrees relative to the plane (X-X), by the natural configuration of the LEDs or by guides or baffles that channel the insect attracting light in the desired direction, and to the centre of the trap away from the perimeter running between the cover and the back housing.

14. A method of attracting flying insects to an insect trap, comprising: diffusing light emitted by light emitting diodes (LEDs) which emit ultra violet (UV) radiation with a peak wavelength of 360-370 nm via a light source, wherein the LEDs are mounted in front of a back housing and an insect capture or killing mechanism, and behind a cover on a mount such that the light source is directed:

parallel to a plane (X-X) running parallel to the back housing and with a spread of between plus 60 degrees to minus 60 degrees relative to the plane, by the natural configuration of the LEDs or by guides or baffles that channel the insect attracting light in the desired direction, and to a centre of the trap away from a perimeter running between the cover and the back housing.

15. The method as claimed in claim 14, wherein diffusing the light emitted by the LEDs includes splaying the light to the plane of the back housing and the insect capture or killing mechanism.

16. The method as claimed in claim 15, wherein the splay is up to 30 degrees relative to the plane (X-X) towards the insect capture or killing mechanism.

* * * * *